(12) United States Patent
Yang et al.

(10) Patent No.: US 9,189,055 B2
(45) Date of Patent: Nov. 17, 2015

(54) METHOD FOR PERFORMING POWER CONSUMPTION MANAGEMENT, AND ASSOCIATED APPARATUS

(75) Inventors: Jen-Chieh Yang, Hsinchu (TW);
Yong-Sheng Lo, Taichung (TW);
Chih-Chieh Chang, Kaohsiung (TW);
Chun-Wei Chen, Taichung (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 580 days.

(21) Appl. No.: 13/550,621

(22) Filed: Jul. 17, 2012

(65) Prior Publication Data

US 2014/0025322 A1    Jan. 23, 2014

(51) Int. Cl.
*G06F 19/00* (2011.01)
*G06F 1/32* (2006.01)
*H04W 52/02* (2009.01)

(52) U.S. Cl.
CPC ............ *G06F 1/3212* (2013.01); *G06F 1/3234* (2013.01); *H04W 52/0258* (2013.01); *Y02B 60/1292* (2013.01)

(58) Field of Classification Search
CPC . F06F 1/3212; G06F 1/3234; H04W 52/0261
USPC .............. 702/63; 455/405, 414.1, 556.2, 572, 455/574; 715/772
See application file for complete search history.

(56) References Cited

U.S. PATENT DOCUMENTS

| | | | | |
|---|---|---|---|---|
| 5,248,929 | A * | 9/1993 | Burke | 320/127 |
| 5,333,176 | A * | 7/1994 | Burke et al. | 455/557 |
| 6,433,512 | B1 * | 8/2002 | Birkler et al. | 320/132 |
| 7,012,558 | B1 * | 3/2006 | Arimura et al. | 341/155 |
| 8,452,352 | B2 * | 5/2013 | Kothari et al. | 455/574 |
| 8,588,870 | B1 * | 11/2013 | Vargantwar | 455/574 |
| 8,620,258 | B2 * | 12/2013 | Harris | 455/405 |
| 2010/0026281 | A1 * | 2/2010 | Nishikawa | 324/207.13 |
| 2011/0111799 | A1 * | 5/2011 | Kothari et al. | 455/556.2 |
| 2011/0304302 | A1 * | 12/2011 | Kim | 320/134 |
| 2012/0088525 | A1 * | 4/2012 | Kurokawa et al. | 455/456.5 |
| 2012/0278749 | A1 * | 11/2012 | Paakonen et al. | 715/772 |
| 2013/0042122 | A1 * | 2/2013 | Hackborn et al. | 713/300 |

FOREIGN PATENT DOCUMENTS

| | | |
|---|---|---|
| CN | 101903845 A | 12/2010 |
| CN | 102089731 A | 6/2011 |
| CN | 102498739 A | 6/2012 |
| CN | 102508761 A | 6/2012 |
| JP | 2006350481 A | 12/2006 |
| TW | I277304 | 3/2007 |
| WO | 2011155106 A1 | 12/2011 |

* cited by examiner

*Primary Examiner* — Carol S Tsai
(74) *Attorney, Agent, or Firm* — Winston Hsu; Scott Margo

(57) ABSTRACT

A method and an apparatus for performing power consumption management are provided, where the method is applied to an electronic device. The method includes: obtaining current information corresponding to an application from a database, the current information being of at least one current on at least one current path between a battery and at least one portion of the electronic device; and performing battery drain prediction corresponding to the application according to the current information. The method may further include: performing sampling operations to generate a plurality of samples of the current, and more particularly, utilizing an ADC to perform analog-to-digital conversion on a voltage difference corresponding to the current to generate the plurality of samples. The voltage difference can be obtained by probing two terminals of a resistor or a Hall component.

20 Claims, 7 Drawing Sheets

METHOD FOR PERFORMING POWER CONSUMPTION MANAGEMENT, AND ASSOCIATED APPARATUS

BACKGROUND

The present invention relates to power management mechanism of an electronic device, and more particularly, to a method for performing power consumption management, and to an associated apparatus.

A conventional portable electronic device (e.g., a multi-functional mobile phone, a personal digital assistant (PDA), a tablet, etc.) can be very useful. More particularly, there are various kinds of applications (e.g., games) designed to be installed in the conventional portable electronic device mentioned above, and the user of the conventional portable electronic device may download some of the applications from the Internet. In a situation where a downloaded application is not properly designed, some problems may occur. For example, the user may encounter rapid battery drain due to the downloaded application. In another example, the user may know that the rapid battery drain problem would probably be encountered due to the downloaded application, but it seems unlikely that the conventional portable electronic device can provide sufficient information to help the user since the conventional portable electronic device typically displays the remaining power percentage for the whole system only. In conclusion, the related art does not serve the end user well. Thus, a novel method is required for enhancing power consumption management of an electronic device.

SUMMARY

It is therefore an objective of the claimed invention to provide a method for performing power consumption management, and to provide an associated apparatus, in order to solve the above-mentioned problems.

An exemplary embodiment of a method for performing power consumption management is provided, where the method is applied to an electronic device. The method comprises the steps of: obtaining current information corresponding to an application from a database, the current information being of at least one current on at least one current path between a battery and at least one portion of the electronic device; and performing battery drain prediction corresponding to the application according to the current information.

An exemplary embodiment of an apparatus for performing power consumption management is provided, where the apparatus comprises at least one portion of an electronic device. The apparatus comprises a fuel gauge circuit and a processing circuit. The fuel gauge circuit is capable of generating data for establishing a database. In addition, the processing circuit is capable of obtaining current information corresponding to an application from the database, the current information being of at least one current on at least one current path between a battery and at least one portion of the electronic device, wherein the processing circuit is capable of performing battery drain prediction corresponding to the application according to the current information.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
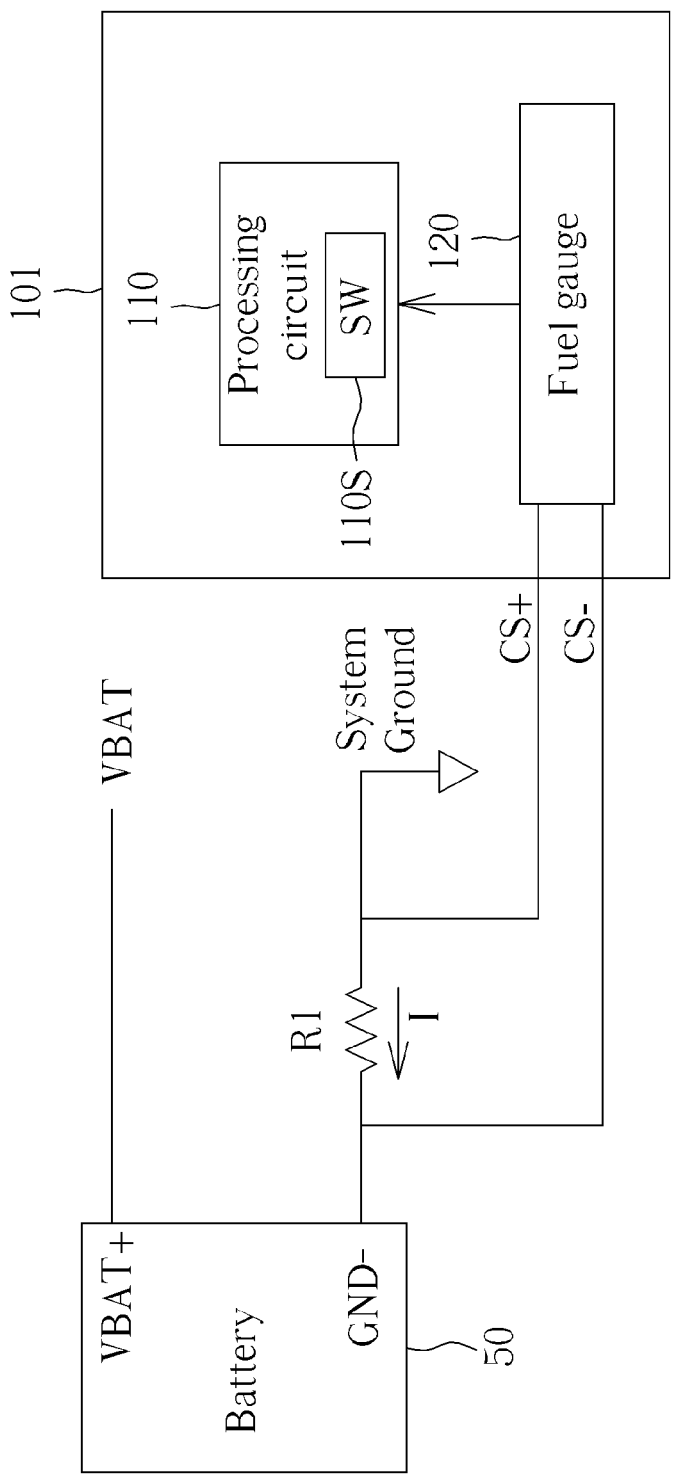
FIG. 1 illustrates some implementation details involved with an apparatus for performing power consumption management according to an embodiment of the present invention.

Please refer to FIG. 1, which illustrates some implementation details involved with an apparatus 101 for performing power consumption management according to an embodiment of the present invention. According to different embodiments, such as this embodiment and some variations thereof, the apparatus 101 may comprise at least one portion (e.g. a portion or all) of an electronic device such as a portable electronic device. For example, the apparatus 101 may comprise a portion of the electronic device mentioned above, and more particularly, can be a control circuit such as an integrated circuit (IC) within the electronic device. In another example, the apparatus 101 can be the whole of the electronic device mentioned above. In another example, the apparatus 101 can be an audio/video system comprising the electronic device mentioned above. Examples of the electronic device may include, but not limited to, a mobile phone (e.g. a multifunctional mobile phone), a personal digital assistant (PDA), a portable electronic device such as the so-called tablet (based on a generalized definition), and a personal computer such as a tablet personal computer (which can also be referred to as the tablet, for simplicity), a laptop computer, or desktop computer.

Based upon the architecture shown in FIG. 1, the apparatus 101 is capable of sensing at least one current I on at least one current path between a battery and at least one portion of the aforementioned electronic device by performing sampling operations to generate a plurality of samples $\{I_{SAMPLE}\}$. For example, in a situation where the aforementioned at least one current comprises a plurality of currents $\{I\}$ such as currents $I_1$, $I_2$, $I_3$, etc. (not shown in FIG. 1), the apparatus 101 is capable of sensing the currents $\{I\}$ such as the currents $I_1$, $I_2$, $I_3$, etc. on multiple current paths between the battery and multiple portions of the electronic device by performing the sampling operations to generate the samples $\{I_{SAMPLE}\}$, respectively. In another example, in a situation where the aforementioned at least one current comprises one current I, such as the total current output (or drawn) from the battery or the total current input into the battery, the apparatus 101 is capable of sensing the current I on one current path between the battery and at least one portion of the electronic device by performing the sampling operations to generate the samples $\{I_{SAMPLE}\}$. In addition, the apparatus 101 is capable of performing calculation on the samples $\{I_{SAMPLE}\}$ to monitor the current I. Additionally, when it is detected that battery drain prediction is required, the apparatus 101 is capable of triggering a battery drain prediction operation to be performed within the electronic device, such as the battery drain prediction operation to be performed based upon the calculation.

According to this embodiment, the apparatus 101 can comprise a processing circuit 110 and a fuel gauge circuit 120 (labeled "Fuel gauge" in FIG. 1, for brevity), which can be implemented within an integrated circuit of the electronic device, where the processing circuit 110 can operate according to software module 110S running on the processing circuit 110. The fuel gauge circuit 120 is capable of sensing the aforementioned at least one current on the fly (e.g., when the user is doing something with the aid of the electronic device) and generating associated data for establishing a database. In addition, the processing circuit 110 is capable of obtaining current information corresponding to an application (e.g. an application that is selected to run on the processing circuit 110, or an application that is running on the processing circuit 110) from the database, such as the current information of the aforementioned at least one current, where the processing circuit 110 is capable of performing battery drain prediction corresponding to the application according to the current information.

In practice, the database can be stored in a storage module (not shown in FIG. 1) that may be implemented within or outside the electronic device, depending on different design requirements. For example, the storage module can be implemented within the processing circuit 110. In another example, the storage module can be implemented as a memory module comprising a memory (e.g. a volatile memory such as a random access memory (RAM), or a non-volatile memory such as a Flash memory) and associated control circuits. In another example, the storage module can be implemented as a memory card module for accessing a memory card comprising a non-volatile memory such as a Flash memory. In another example, the storage module can be implemented as a hard disk drive (HDD).

Please note that the moving average calculation can be taken as an example of a portion of the aforementioned calculation. This is for illustrative purposes only, and is not meant to be a limitation of the present invention. According to a variation of this embodiment, the aforementioned calculation may comprise calculating an average of some of the samples $\{I_{SAMPLE}\}$ within a predetermined unit interval (e.g. a time period of a predetermined length), where the predetermined unit interval may be adjusted based upon different design requirements or be adjusted by user. According to another variation of this embodiment, the average may be replaced by a sum. For example, the aforementioned calculation may comprise calculating the sum of some of the samples $\{I_{SAMPLE}\}$ within a predetermined unit interval such as that mentioned above. According to another variation of this embodiment, the average may be replaced by a maximum. For example, the aforementioned calculation may comprise calculating the maximum of some of the samples $\{I_{SAMPLE}\}$ within a predetermined unit interval such as that mentioned above.

As shown in FIG. 1, a battery 50 is taken as an example of the battery mentioned above, where the positive terminal VBAT+ of the battery 50 can be electrically coupled to the battery input terminal VBAT of the electronic device, and the ground terminal GND− of the battery 50 can be coupled to the system ground of the electronic device through a resistor R1. Here, an integrated circuit is taken as an example of implementing the apparatus 101. This is for illustrative purposes only, and is not meant to be a limitation of the present invention. According to some variations of this embodiment, it is unnecessary to implement the apparatus 101 with an integrated circuit, where the apparatus 101 can be implemented to be a non-integrated-circuit apparatus, such as a system comprising some components positioned on a printed circuit board (PCB). According to the embodiment shown in FIG. 1, the fuel gauge circuit 120 may comprise an analog-to-digital converter (ADC) (not shown in FIG. 1) having a first input terminal CS+ and a second input terminal CS−. To generate data for establishing the database, the apparatus 101 may further utilize at least one resistor having a first terminal and a second terminal, such as the resistor R1 shown in FIG. 1, where the first input terminal CS+ and the second input terminal CS− can be utilized for receiving a first voltage level at the first terminal and a second voltage level at the second terminal, respectively. The apparatus 101 can utilize the ADC mentioned above to perform analog-to-digital conversion on a voltage difference corresponding to the current I to generate a plurality of digital values of the voltage difference, and obtains the plurality of samples $\{I_{SAMPLE}\}$ of the current according to the digital values, for use of generating the current information, where the voltage difference is a difference between the first voltage level at the first terminal and the second voltage level at the second terminal. More particularly, the fuel gauge circuit 120 is capable of dividing the digital values by the resistance value of the resistor R1 to obtain the plurality of samples $\{I_{SAMPLE}\}$ This is for illustrative purposes only, and is not meant to be a limitation of the present invention. According to a variation of this embodiment, the apparatus 101 may utilize at least one Hall component having a first terminal and a second terminal, where the resistor R1 is replaced with the aforementioned at least one Hall component. Thus, the voltage difference is a difference between the first voltage level at the first terminal of the Hall component and the second voltage level at the second terminal of the Hall component.

As disclosed in FIG. 1, the fuel gauge circuit 120 can be implemented as a module outside the processing circuit 110 of the electronic device. This is for illustrative purposes only, and is not meant to be a limitation of the present invention. According to a variation of this embodiment, at least one portion (e.g. a portion or all) of the fuel gauge circuit 120 can be implemented by utilizing the processing circuit 110, and more particularly, can be implemented by utilizing program code to be executed by the processing circuit 110. For example, at least one portion (e.g. a portion or all) of the modules/units/components within the fuel gauge circuit 120 shown in FIG. 1 can be implemented as software modules of the program code mentioned above.

Figure 2:
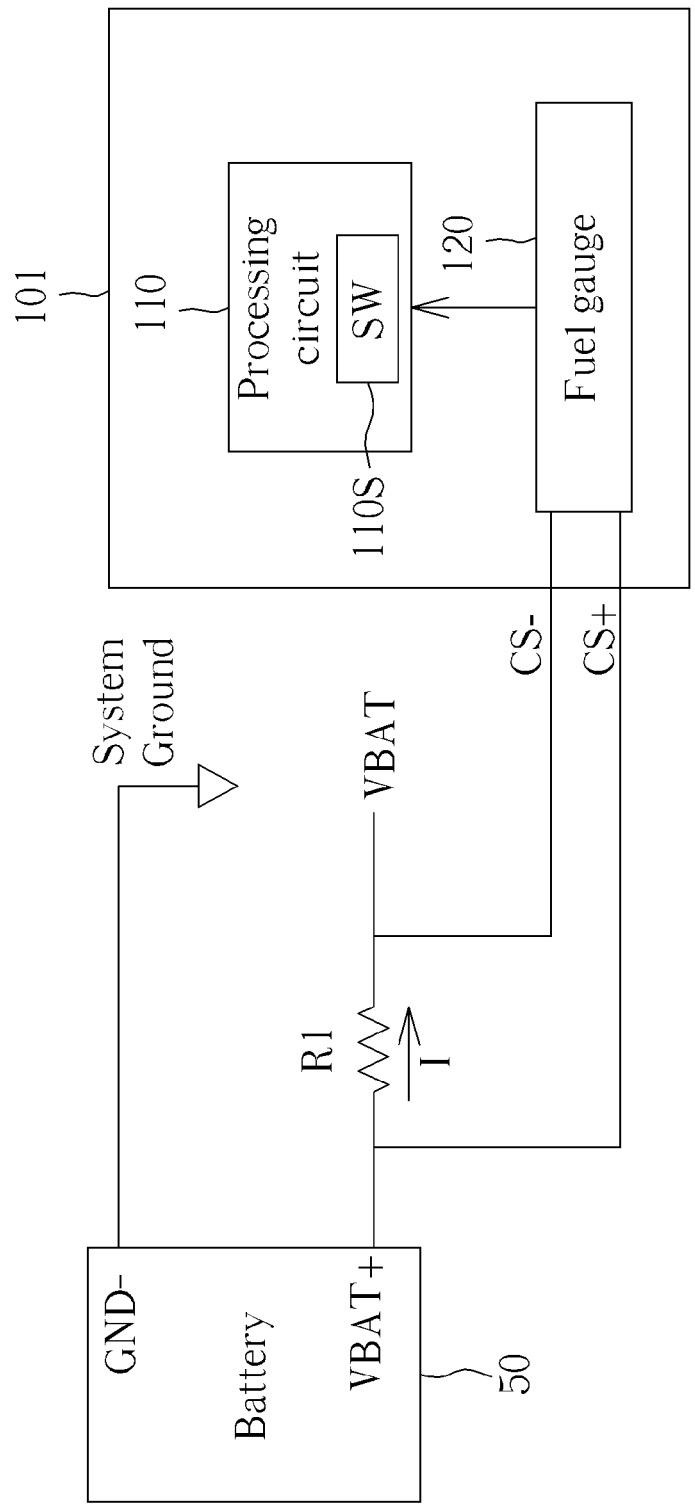
FIG. 2 illustrates some implementation details involved with the apparatus for performing power consumption management according to another embodiment of the present invention.

FIG. 2 illustrates some implementation details involved with the apparatus 101 shown in FIG. 1 according to another embodiment of the present invention, where the positive terminal VBAT+ of the battery 50 can be coupled to the battery input terminal VBAT of the electronic device through the resistor R1, and the ground terminal GND− of the battery 50 can be electrically coupled to the system ground of the electronic device. Similar descriptions are not repeated in detail for this embodiment.

According to a variation of this embodiment, the apparatus 101 may utilize at least one Hall component having a first terminal and a second terminal, where the resistor R1 is replaced with the aforementioned at least one Hall component. Thus, the voltage difference is a difference between the first voltage level at the first terminal of the Hall component and the second voltage level at the second terminal of the Hall component. Similar descriptions are not repeated in detail for this variation.

Figure 3:
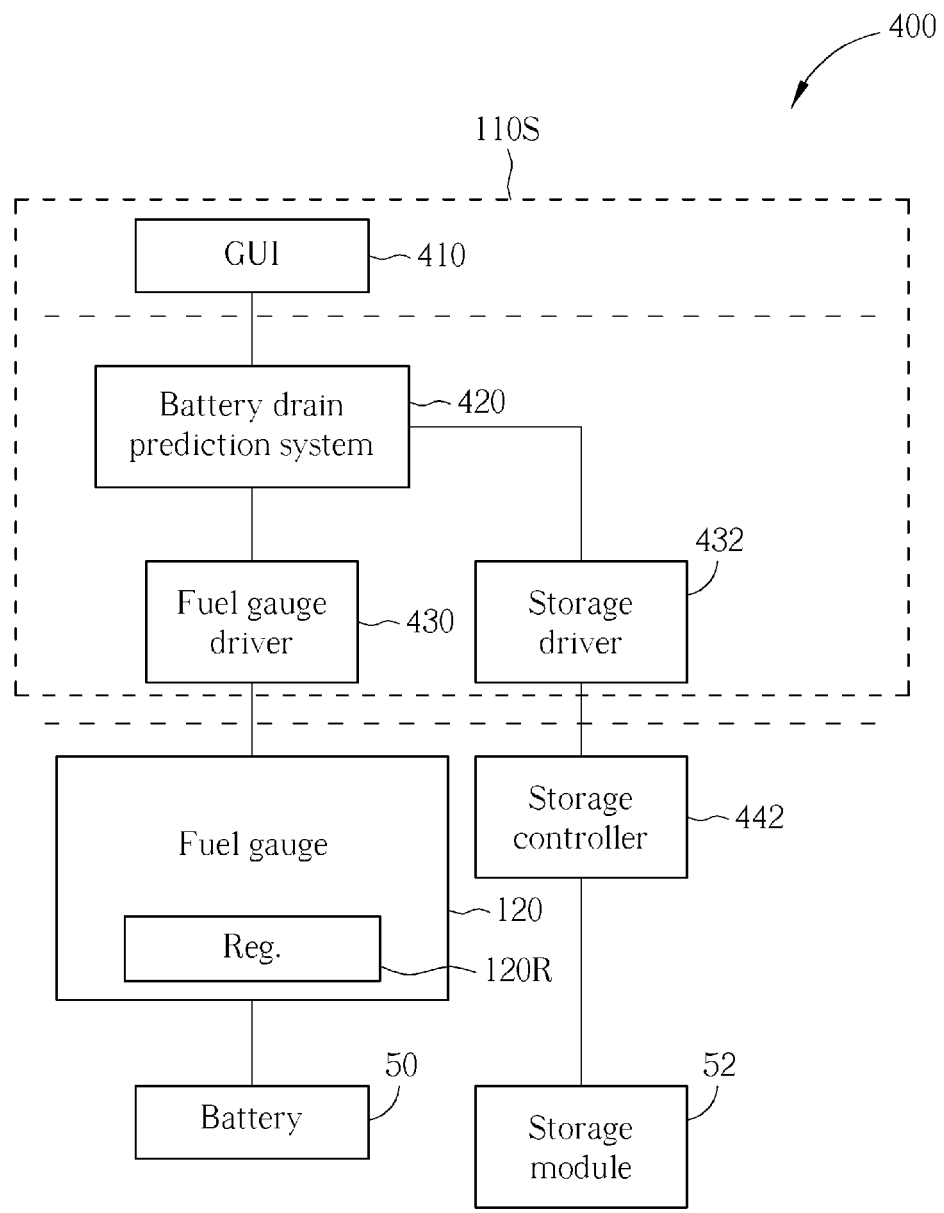
FIG. 3 illustrates an implementation scheme involved with the apparatus for performing power consumption management according to an embodiment of the present invention.

FIG. 3 illustrates an implementation scheme involved with the apparatus 101 shown in FIG. 1 according to an embodiment of the present invention. For brevity, the screen of the electronic device can be described as a touch screen. This is for illustrative purposes only, and is not meant to be a limitation of the present invention. According to some variations of this embodiment, the screen of the electronic device can merely be implemented as a normal non-touch screen such as a liquid crystal display (LCD) module.

As shown in FIG. 3, the system 400 implemented according to the implementation scheme may comprise a graphical user interface (GUI) software module 410 (labeled "GUI" in FIG. 3), a battery drain prediction system 420, a fuel gauge driver 430, a storage driver 432, the aforementioned fuel gauge circuit 120 (labeled "Fuel gauge" in FIG. 3), and a storage controller 442. As shown in FIG. 3, the fuel gauge circuit 120 of this embodiment may comprise one or more registers 120R (labeled "Reg." in FIG. 3) for being controlled by the fuel gauge driver 430, where the battery 50 is taken as an example of the battery mentioned in the first embodiment, and a storage module 52 is taken as an example of the storage module mentioned above. For example, the ADC disclosed above can be implemented within the fuel gauge circuit 120 of this embodiment. It should be noted that battery 50 and storage module 52 can be external or internal to the system 400.

According to this embodiment, the GUI software module 410 is capable of outputting a GUI to provide the user with information such as the application name of the application that the user selects to run and the power consumption status of the application under consideration, and is capable of utilizing the GUI to provide the user with options of whether to run the application under consideration or not, and more particularly to provide one or more virtual buttons displayed on the touch screen of the electronic device, such as two virtual buttons respectively labeled "Run" and "Cancel" (not shown in FIG. 3). In addition, the battery drain prediction system 420 is capable of collecting application-related information of the application under consideration (e.g. name, size, file location thereof, the number of times that the application has run on the electronic device, etc.) and obtaining (or getting) power-related information such as the battery capacity of the battery 50, the remaining power of the battery 50, and/or the current I on the fly from the fuel gauge driver 430 and/or the storage driver 432, in order to generate the information to be displayed through the GUI mentioned above, where the fuel gauge circuit 120 is capable of sensing the current I on the fly to support the operations of the battery drain prediction system 420. For example, when the user touches the virtual button labeled "Run", which means the user decides to run the application under consideration, the battery drain prediction system 420 may control the electronic device to start or continue running the application. In another example, when the user touches the virtual button labeled "Cancel", which means the user decides to cancel running the application under consideration, the battery drain prediction system 420 may control the electronic device to temporarily prevent the application under consideration from running or starting running, or to stop running the application. Additionally, the fuel gauge driver 430 and the storage driver 432 can be regarded as low level software drivers, and are capable of controlling hardware features and/or getting hardware information. For example, the fuel gauge driver 430 is capable of accessing the fuel gauge circuit 120, such as setting the set of registers 120R. In another example, the storage driver 432 is capable of accessing the storage module 52 through the storage controller 442.

In particular, the battery drain prediction system 420 may be equipped with a timer (not shown in FIG. 3). When a certain application such as the application mentioned in the first embodiment is running on the electronic device, the battery drain prediction system 420 is capable of reading the current on the fly, for example, periodically (or repeatedly), from the fuel gauge circuit 120 through the fuel gauge driver 430, in order to calculate the average current, for being stored in the database. In some embodiments, the battery drain prediction system 420 is capable of reading at least one portion (e.g. a portion or all) of the plurality of samples $\{I_{SAMPLE}\}$. When the user tries to run the same application again, as the battery drain prediction system 420 may obtain the information of the remaining power of the battery 50 (e.g., the remaining power measured in units of milliampere-hour (mAh)), and may further obtain the average current (e.g., the average current measured in units of milliampere (mA)) from the database, the battery drain prediction system 420 can calculate the remaining time for running the application under consideration to perform the battery drain prediction corresponding to the application.

In practice, the software modules 110S can be implemented by utilizing the aforementioned program code to be executed by at least one processor within the processing circuit 110 shown in any of FIG. 1 or FIG. 2. As the battery drain prediction system 420 is the core module within the software modules 110S, some operations regarding the battery drain prediction system 420 are further described in the following embodiments.

Figure 4:
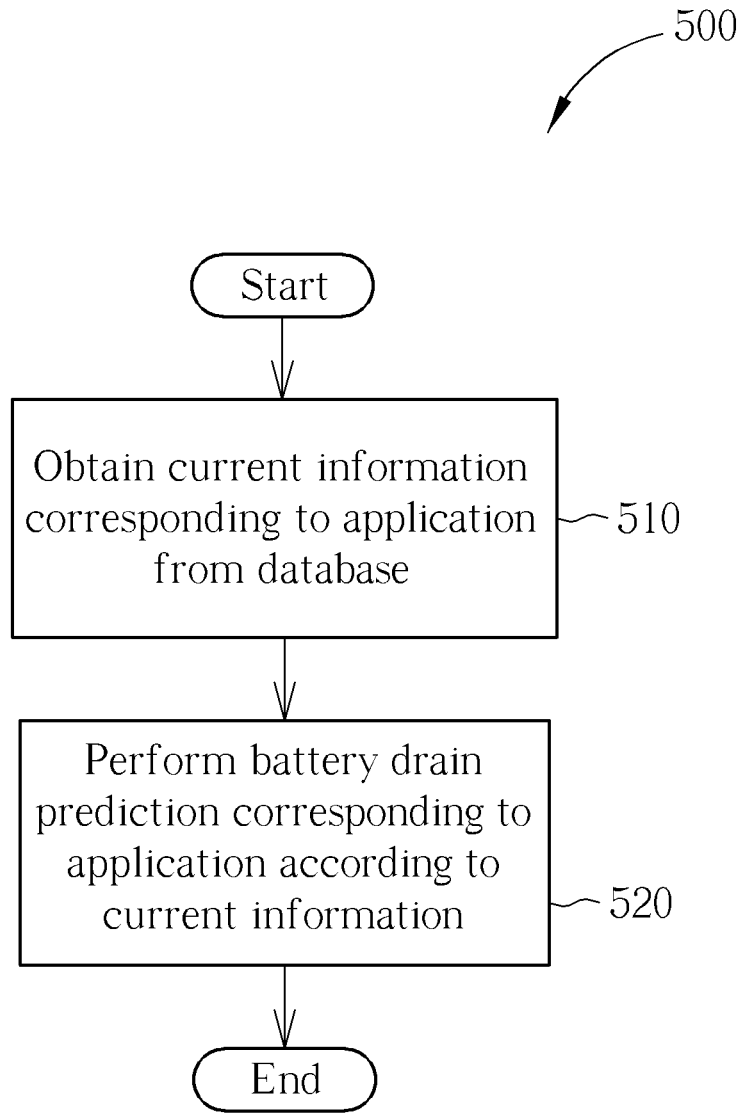
FIG. 4 illustrates a flowchart of a method for performing power consumption management according to an embodiment of the present invention.

FIG. 4 illustrates a flowchart of a method 500 for performing power consumption management according to an embodiment of the present invention. The method 500 shown in FIG. 4 can be applied to the apparatus 101 shown in FIG. 1 or FIG. 2, and more particularly, can be applied to the battery drain prediction system 420 disclosed above. The method is described as follows.

In Step 510, the processing circuit 110 (more particularly, the battery drain prediction system 420) is capable of obtaining the current information corresponding to the application from the database, the current information being of at least one current on at least one current path between the battery and at least one portion of the electronic device.

In Step 520, the processing circuit 110 (more particularly, the battery drain prediction system 420) is capable of performing the battery drain prediction corresponding to the application according to the current information.

According to this embodiment, when the application is run on the electronic device for the first time or any other time, the processing circuit 110 (more particularly, the battery drain prediction system 420) is capable of obtaining/generating the current information and storing the current information into the database, for use of performing the battery drain prediction corresponding to the application, where the current information may comprise an average of multiple samples of the current (e.g. an average of at least one portion of the plurality of samples $\{I_{SAMPLE}\}$). More specifically, in order to prepare for the battery drain prediction corresponding to the application, the processing circuit 110 (more particularly, the battery drain prediction system 420) may record the current on the fly, record the time period of running the application, calculate the average current, and store at least one portion of the associated information (e.g. the current, the time period of running the application, and/or the average current) comprising the current information mentioned above. The processing circuit 110 is capable of performing calculation on the plurality of samples $\{I_{SAMPLE}\}$ of the current, in order to establish the database.

Please note that, based on the database, the processing circuit 110 is capable of checking whether the application that the user selects to run has previously run on the electronic device at least once, since there can be at least one record (or the recorded information) regarding the application within the database after the processing circuit 110 stores the aforementioned at least one portion of the associated information disclosed above. For user's convenience, the battery drain prediction corresponding to all of a plurality of applications installed on the electronic device can be enabled by default. Thus, in a situation where the application that the user selects to run has previously run on the electronic device at least once, the processing circuit 110 (more particularly, the battery drain prediction system 420) can help the user to save power with the aid of the battery drain prediction corresponding to the application. As a result, when the application is run on the electronic device again, the processing circuit 110 is capable of performing the battery drain prediction corresponding to the application automatically. This is for illustrative purposes only, and is not meant to be a limitation of the present invention. According to a variation of this embodiment, the battery drain prediction corresponding to at least one portion (e.g. a portion or all) of the applications can be disabled when needed. For example, based on some user settings, the processing circuit 110 can disable the battery drain prediction corresponding to the aforementioned at least one portion (e.g. a portion or all) of the applications.

As mentioned above, the processing circuit 110 is capable of performing calculation on the plurality of samples $\{I_{SAMPLE}\}$ of the current, in order to establish the database. This is for illustrative purposes only, and is not meant to be a limitation of the present invention. Please note that, when the application is run on the electronic device again, the processing circuit 110 is capable of performing calculation on the latest samples of the current, in order to update the database, where the accuracy of the battery drain prediction corresponding to the application may be enhanced.

In the embodiment shown in FIG. 4, when performing the battery drain prediction operation corresponding to the application, the processing circuit 110 can provide a user interface such as the GUI mentioned above and output battery drain prediction information comprising at least one prediction result of the battery drain prediction (more particularly, the battery drain prediction information of the application mentioned in Step 520, such as the predicted power consumption of the application, the predicted current consumption of the application, the remaining power of the battery 50, the predicted battery drain time of the application before battery drain occurs, and/or the suggested time to start charging the battery 50 based upon the calculation), allowing the user to determine whether to cancel running the application that the user selects to run. As a result, when it is detected that the user cancels running the application, the processing circuit 110 may temporarily prevent the application from running or starting to run on the electronic device. This is for illustrative purposes only, and is not meant to be a limitation of the present invention. According to some variations of this embodiment, when it is detected that the user cancels running the application, the processing circuit 110 may stop running the application.

Figure 5:
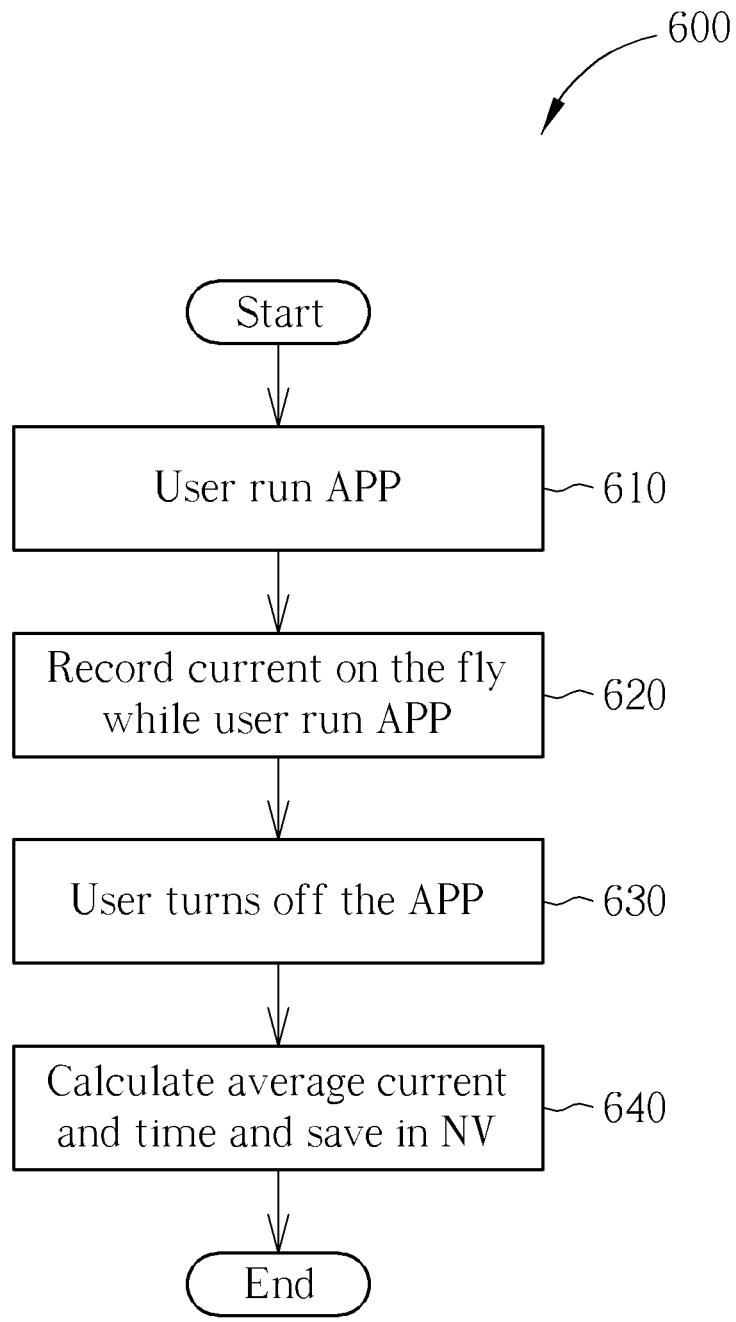
FIG. 5 illustrates a working flow involved with the method shown in FIG. 4 according to an embodiment of the present invention.
Figure 6:
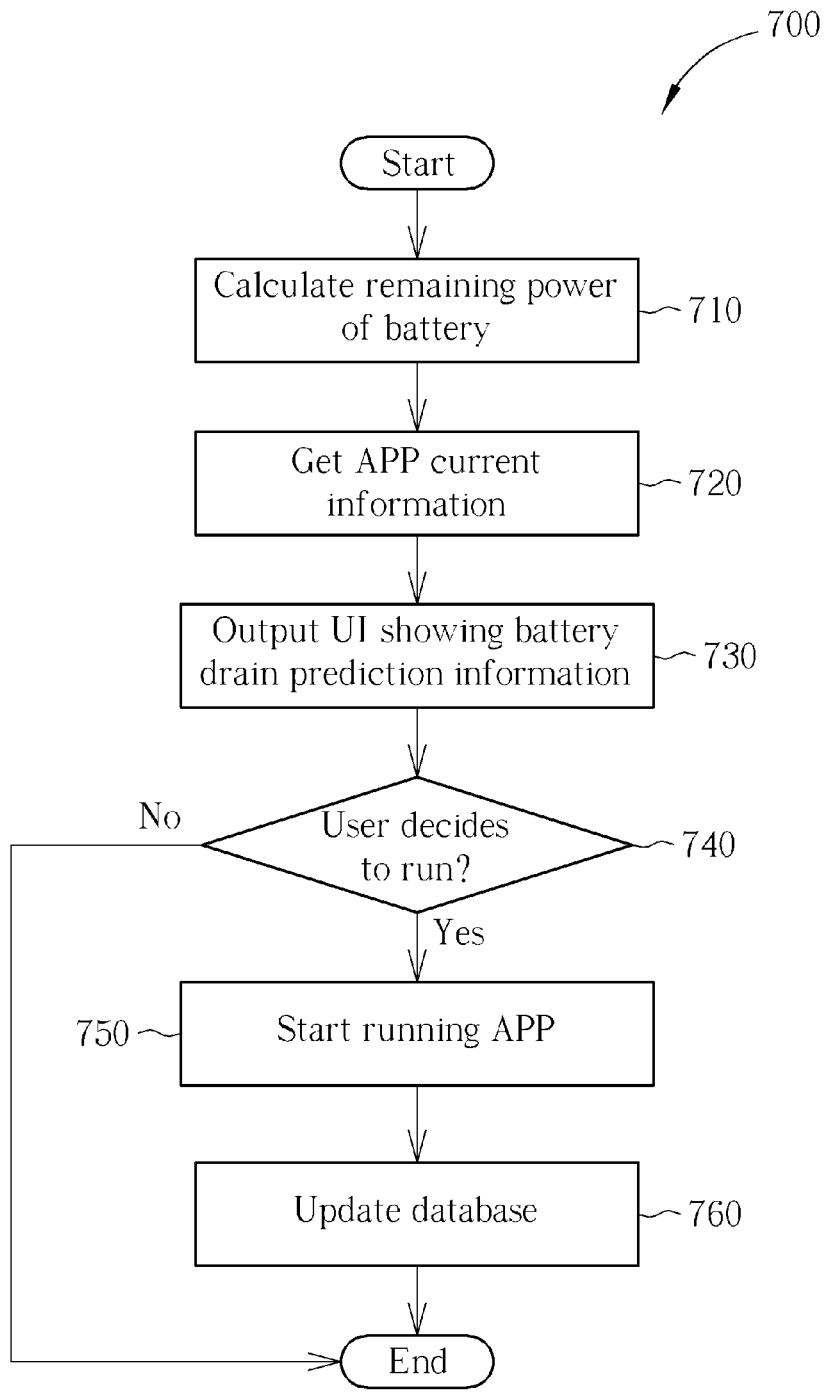
FIG. 6 illustrates a working flow involved with the method shown in FIG. 4 according to another embodiment of the present invention.
Figure 7:
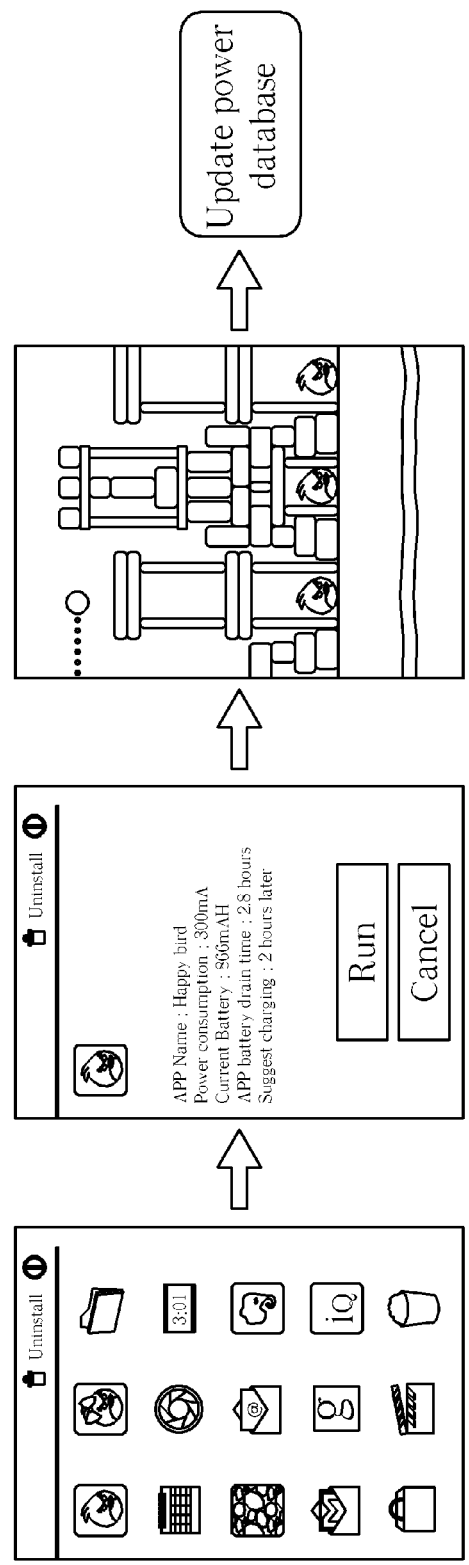
FIG. 7 illustrates a power consumption management control scheme involved with the method shown in FIG. 4 according to an embodiment of the present invention.

Please note that at least one portion (e.g. a portion or all) of the working flow shown in FIG. 4 can be repeated in some variations of this embodiment, such as any of the following embodiments (e.g. the embodiments respectively shown in FIG. 5, FIG. 6, and FIG. 7). For example, in a situation where the whole of the working flow shown in FIG. 4 can be repeated, the processing circuit 110 is capable of detecting whether the battery drain prediction is required for each of the applications that the user selects to run, and is capable of triggering the battery drain prediction operation to be performed within the electronic device for these applications that the user selects to run, respectively.

FIG. 5 illustrates a working flow 600 involved with the method 500 shown in FIG. 4 according to an embodiment of the present invention. For example, the working flow 600 may start in a situation where the user just downloads a new application (e.g. a new game), which can be taken as an example of the application mentioned in Step 520. In another example, the working flow 600 may start in a situation where the user tries to use a new native application (e.g. a new game), which can be taken as an example of the application mentioned in Step 520, where the new native application is originally installed in the electronic device when the user purchase the electronic device, rather than being downloaded by the user.

In Step 610, the user runs the application (labeled "APP" in FIG. 5). This is for illustrative purposes only, and is not meant to be a limitation of the present invention. According to a variation of this embodiment, running the application may be triggered by the electronic device, rather than the user.

In Step 620, the processing circuit 110 (more particularly, the battery drain prediction system 420) is capable of recording the current I on the fly by utilizing the fuel gauge circuit 120 while the user runs the application.

In Step 630, the user turns off the application.

In Step 640, the processing circuit 110 (more particularly, the battery drain prediction system 420) is capable of calculating the average current and time and saving them in a non-volatile memory (labeled "NV" in FIG. 5) such as that mentioned above. For example, the processing circuit 110 (more particularly, the battery drain prediction system 420) may save the associated information mentioned above into the aforementioned database. More particularly, the associated information mentioned above may comprise the identification information of the application (i.e. information that helps identify the application), related information of the application, the luminance of the screen of the electronic device (more particularly, the touch screen mentioned above) during running the application.

As mentioned above, the processing circuit 110 is capable of calculating the average current and time and saving them in the non-volatile memory (labeled "NV" in FIG. 5) such as that mentioned above. This is for illustrative purposes only, and is not meant to be a limitation of the present invention. According to a variation of this embodiment, the processing circuit 110 can calculate the average current and time and save them in another storage device that is not a non-volatile memory.

FIG. 6 illustrates a working flow 700 involved with the method 500 shown in FIG. 4 according to another embodiment of the present invention. For example, the working flow 700 may start in a situation where the user selects to run the aforementioned new application (e.g. the aforementioned new game) another time, and therefore, the aforementioned new application can be regarded as an old application (e.g. an old game), which can be taken as an example of the application mentioned in Step 520. In another example, the working flow 700 may start in a situation where the user tries to run the aforementioned new native application another time, and therefore, the aforementioned new native application can be regarded as an old application (e.g. an old game), which can be taken as an example of the application mentioned in Step 520.

In Step 710, the processing circuit 110 (more particularly, the battery drain prediction system 420) is capable of calculating the remaining power of the battery 50.

In Step 720, the processing circuit 110 (more particularly, the battery drain prediction system 420) is capable of getting the application current information (labeled "APP current information" in FIG. 6) from one or more components, such as the fuel gauge circuit 120 and/or the storage controller 442, where the application current information of this embodiment typically includes the current information of the current I, such as the current output (or drawn) from the battery or the current input into the battery, regarding the application that the user just selects to run.

For example, in a situation where the processing circuit 110 allows the application under consideration to start running and then performs the operation of Step 720, the application current information may comprise a real-time detected (or real-time measured) value of the current I during running the application under consideration and/or a real-time detected (or real-time measured) increment of the current I due to running the application under consideration. In another example, in a situation where the processing circuit 110 temporarily prevents the application under consideration from starting running and then performs the operation of Step 720, the application current information may comprise a predicted value of the current I during running the application under consideration and/or a predicted increment of the current I due to running the application under consideration. Please note that the processing circuit 110 (more particularly, the battery drain prediction system 420) is capable of obtaining the predicted value of the current I and/or the predicted increment of the current I from the database, or utilizing the existing data or the existing information in the database (e.g. the average current recorded in the database during or after the previous running of the application) to calculate the predicted value of the current I and/or the predicted increment of the current I.

In Step 730, the processing circuit 110 is capable of outputting a user interface (labeled "UI" in FIG. 6) showing the aforementioned battery drain prediction information. An example of the user interface may be a GUI such as that mentioned in the embodiment shown in FIG. 3. As a result, the battery drain prediction information may be displayed on the screen of the electronic device (e.g. the touch screen mentioned above). For example, the battery drain prediction information that the user can see may comprise the application name of the application that the user just selects to run and the power consumption status of the application under consideration, and the processing circuit 110 is capable of utilizing the user interface such as the GUI to provide the user with the aforementioned options of whether to run the application under consideration or not, for example, to provide the aforementioned multiple virtual buttons displayed on the touch screen of the electronic device, such as the two virtual buttons respectively labeled "Run" and "Cancel".

In Step 740, the processing circuit 110 is capable of detecting whether the user decides to run the application under consideration. For example, the user may have seen the battery drain prediction information, and then probably touches the virtual button labeled "Run" or touches the virtual button labeled "Cancel". When it is detected that the user decides to run the application under consideration (e.g. the user touches the virtual button labeled "Run"), Step 750 is entered; otherwise (e.g. the user touches the virtual button labeled "Cancel"), the working flow 700 comes to the end.

In Step 750, the processing circuit 110 may control the electronic device to start or continue running the application under consideration. For example, in a situation where, in Step 720, the processing circuit 110 allows the application under consideration to start running and then performs the operation of Step 720, when Step 750 is entered, the processing circuit 110 is capable of controlling the electronic device to continue running the application under consideration. In another example, in a situation where, in Step 720, the processing circuit 110 temporarily prevents the application under consideration from starting running and then performs the operation of Step 720, when Step 750 is entered, the processing circuit 110 is capable of controlling the electronic device to start running the application under consideration. Please note that, regarding the appearance of the GUI that the user can see, there may be no difference between these two situations for the user. Thus, no matter the former or the latter of these two situations is involved, in Step 750, the user may feel the same (e.g., in Step 750, the user feels that the electronic device just start running the application under consideration).

In Step 760, the processing circuit 110 (more particularly, the battery drain prediction system 420) is capable of updating the database mentioned above. For example, the processing circuit 110 (more particularly, the battery drain prediction system 420) is capable of performing calculation on the latest samples of the current, in order to update the database, where the accuracy of the battery drain prediction corresponding to the application may be enhanced.

FIG. 7 illustrates a power consumption management control scheme involved with the method 500 shown in FIG. 4 according to an embodiment of the present invention. With the operations disclosed in the embodiments respectively shown in FIG. 5 and FIG. 6 in mind, the displayed contents of the touch screen mentioned above may change from left to right (see the three pictures starting from leftmost of FIG. 7, where the three pictures may be regarded as different screenshots of the touch screen) and then the processing circuit 110 (more particularly, the battery drain prediction system 420) is capable of updating the database.

For example, the user may select the application under consideration (see the first picture, i.e. the leftmost one of the three pictures shown in FIG. 7) and then the processing circuit 110 is capable of outputting the user interface (e.g. the GUI) showing the aforementioned battery drain prediction information such as a set of strings {"APP Name: Happy bird", "Power consumption: 300 mA", "Current Battery: 866 mAH", "APP battery drain time: 2.8 hours", "Suggest charging: 2 hours later"} (see the second picture, i.e. the one next to the leftmost one of the three pictures shown in FIG. 7, where the application is labeled "APP" in the second picture). When the user touches the virtual button labeled "Run", the processing circuit 110 is capable of controlling the electronic device to start running the application under consideration (see the third picture, i.e. the rightmost one of the three pictures shown in FIG. 7). This is for illustrative purposes only, and is not meant to be a limitation of the present invention. Please note that the user may have the option of touching the virtual button labeled "Cancel". According to some variations of this embodiment, in a situation where the user touches the virtual button labeled "Cancel", the processing circuit 110 is capable of controlling the electronic device to stop running the application under consideration or temporarily preventing the application from running.

According to this embodiment, examples of the battery drain prediction information may comprise the aforementioned application name of the application that the user just selects to run (e.g. the application name "Happy bird" listed in the string "APP Name: Happy bird"), the aforementioned power consumption status such as the predicted power/current consumption corresponding to this application measured in unit of milliampere (mA) (e.g. the predicted power/current consumption "300 mA" listed in the string "Power consumption: 300 mA"), the aforementioned remaining power of the battery 50 (e.g. the remaining power "866 mAH" listed in the string "Current Battery: 866 mAH"), the aforementioned predicted battery drain time of the application (e.g. the predicted battery drain time "2.8 hours" listed in the string "APP battery drain time: 2.8 hours"), and the suggested time of starting charging the battery 50 (e.g. "2 hours later" listed in the string "Suggest charging: 2 hours later"). Similar descriptions are not repeated in detail for this embodiment.

According to some embodiments, such as some variations of one or more of the embodiments disclosed above, one or more steps (or one or more operations) of the method can be omitted or one or more steps can be inserted in a situation where the implementation of the method will not be hindered. According to some embodiments, such as some variations of one or more of the embodiments disclosed above, the order of a portion or all of steps (or the order of a portion or all of operations) of the method can be changed in a situation where the implementation of the method will not be hindered. According to some embodiments, such as some variations of one or more of the embodiments disclosed above, one or more steps (or one or more operations) of the method can be repeated performed in a situation where the implementation of the method will not be hindered.

It is an advantage of the present invention that the present invention method and apparatus can provide sufficient information to help the user on power consumption management of the electronic device. In addition, with the aid of the present invention method and apparatus, unexpected power failure caused by unnecessary or excess power consumption may be prevented. Additionally, the present invention method and apparatus can help the user to reduce power consumption of the electronic device. As a result, the user can use the electronic device without being bothered by unexpected power failure caused by unnecessary or excess power consumption, where the related art problems will no longer be an issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing power consumption management, the method being applied to an electronic device, the method comprising the steps of:
   obtaining current information corresponding to an application which is installed and currently running on the electronic device from a database, the current information being of at least one current on at least one current path between a battery and at least one portion of the electronic device; and
   performing battery drain prediction corresponding to the application according to the current information.

2. The method of claim 1, further comprising:
   when the application is run on the electronic device for the first time, generating the current information and storing the current information into the database, for use of performing the battery drain prediction corresponding to the application, wherein the current information comprises an average of a plurality of samples of the current.

3. The method of claim 1, further comprising:
   performing calculation on a plurality of samples of the current, in order to establish/update the database.

4. The method of claim 1, further comprising:
   checking whether the application has previously run on the electronic device at least once.

5. The method of claim 1, further comprising:
   when performing the battery drain prediction corresponding to the application, outputting battery drain prediction information comprising at least one prediction result of the battery drain prediction, allowing the user to determine whether to cancel running the application.

6. The method of claim 1, further comprising:
   when performing the battery drain prediction corresponding to the application, providing a user interface and outputting battery drain prediction information comprising at least one prediction result of the battery drain prediction, allowing a user to determine whether to cancel running the application.

7. The method of claim 6, further comprising:
   when it is detected that the user cancels running the application, stopping running the application; or
   when it is detected that the user cancels running the application, temporarily preventing the application from running on the electronic device.

8. The method of claim 1, further comprising:
   utilizing an analog-to-digital converter (ADC) to perform analog-to-digital conversion on a voltage difference corresponding to the current to generate a plurality of digital values of the voltage difference, and obtaining a plurality of samples of the current according to the digital values, for use of generating the current information.

9. The method of claim 8, wherein the voltage difference is a difference between a first voltage level at a first terminal of at least one resistor and a second voltage level at a second terminal of the resistor.

10. The method of claim 8, wherein the voltage difference is a difference between a first voltage level at a first terminal of at least one Hall component and a second voltage level at a second terminal of the Hall component.

11. An apparatus for performing power consumption management, the apparatus comprising at least one portion of an electronic device, the apparatus comprising:
   a fuel gauge circuit capable of generating data for establishing a database; and
   a processing circuit capable of obtaining current information corresponding to an application which is installed and currently running on the electronic device from the database, the current information being of at least one current on at least one current path between a battery and at least one portion of the electronic device, wherein the processing circuit is capable of performing battery drain prediction corresponding to the application according to the current information.

12. The apparatus of claim 11, wherein when the application is run on the electronic device for the first time, the processing circuit is capable of generating the current information and storing the current information into the database, for use of performing the battery drain prediction corresponding to the application, wherein the current information comprises an average of a plurality of samples of the current.

13. The apparatus of claim 11, wherein the processing circuit is capable of performing calculation on a plurality of samples of the current, in order to establish/update the database.

14. The apparatus of claim 11, wherein the processing circuit is capable of checking whether the application has previously run on the electronic device at least once.

15. The apparatus of claim 11, wherein when performing the battery drain prediction corresponding to the application, the processing circuit is capable of outputting battery drain prediction information comprising at least one prediction result of the battery drain prediction, allowing the user to determine whether to cancel running the application.

16. The apparatus of claim 11, wherein when performing the battery drain prediction corresponding to the application, the processing circuit is capable of providing a user interface and outputting battery drain prediction information comprising at least one prediction result of the battery drain prediction, allowing a user to determine whether to cancel running the application.

17. The apparatus of claim 16, wherein when it is detected that the user cancels running the application, the processing circuit is capable of stopping running the application; or when it is detected that the user cancels running the application, the processing circuit is capable of temporarily preventing the application from running on the electronic device.

18. The apparatus of claim 11, wherein the apparatus utilizes an analog-to-digital converter (ADC) to perform analog-to-digital conversion on a voltage difference corresponding to the current to generate a plurality of digital values of the voltage difference, and obtains a plurality of samples of the current according to the digital values, for use of generating the current information.

19. The apparatus of claim 18, wherein the voltage difference is a difference between a first voltage level at a first terminal of at least one resistor and a second voltage level at a second terminal of the resistor.

20. The apparatus of claim 18, wherein the voltage difference is a difference between a first voltage level at a first terminal of at least one Hall component and a second voltage level at a second terminal of the Hall component.

* * * * *